(12) United States Patent
Polanich (10) Patent No.: US 10,466,010 B2
(45) Date of Patent: Nov. 5, 2019

(54) TENSION MANAGEMENT SYSTEM AND METHODS FOR TORSION DRIVEN, COUNTERACTING BLOCK AND TACKLE PULLEY TYPE ELASTIC ENERGY STORAGE AND DEPLOYMENT SYSTEMS

(71) Applicant: SERPENT RURAL SPORTS LLC, Los Gatos, CA (US)

(72) Inventor: Jonathan C. Polanich, Los Gatos, CA (US)

(73) Assignee: SERPENT RURAL SPORTS LLC, Los Gatos, CA (US)

( * ) Notice: Subject to any disclaimer, the term of this patent is extended or adjusted under 35 U.S.C. 154(b) by 0 days.

(21) Appl. No.: 16/248,566

(22) Filed: Jan. 15, 2019

(65) Prior Publication Data

US 2019/0242672 A1 Aug. 8, 2019

Related U.S. Application Data

(60) Provisional application No. 62/625,854, filed on Feb. 2, 2018.

(51) Int. Cl.
*F41B 7/00* (2006.01)
*F41B 5/00* (2006.01)
*F03G 1/02* (2006.01)
*F41B 5/14* (2006.01)
*F41B 5/10* (2006.01)

(52) U.S. Cl.
CPC ............. *F41B 5/1449* (2013.01); *F03G 1/02* (2013.01); *F41B 5/0094* (2013.01); *F41B 5/105* (2013.01); *F41B 7/00* (2013.01)

(58) Field of Classification Search
CPC .... F41B 3/00; F41B 3/005; F41B 3/03; F41B 5/0094; F41B 5/1449; F41B 7/00; F41B 7/04; F03G 1/02; F16F 15/1213; F16F 15/1333
See application file for complete search history.

(56) References Cited

U.S. PATENT DOCUMENTS

| | | | | |
|---|---|---|---|---|
| 2,821,379 A * | 1/1958 | Donkin | ...................... | F16F 1/10 267/156 |
| 4,846,142 A * | 7/1989 | Tone | ...................... | F41B 5/1449 124/90 |
| 4,903,677 A * | 2/1990 | Colley | ...................... | F41B 5/10 124/23.1 |
| 5,125,389 A * | 6/1992 | Paff | ...................... | F41B 5/1449 124/23.1 |
| 8,567,376 B2 * | 10/2013 | Flint | ...................... | F41B 5/12 124/20.3 |
| 9,067,118 B2 * | 6/2015 | Colding-Kristensen | ...................... | A63B 69/408 |
| 9,303,943 B2 * | 4/2016 | Breslin | ...................... | F41B 7/00 |
| 9,389,041 B2 * | 7/2016 | Novikov | ...................... | F41B 7/00 |

(Continued)

*Primary Examiner* — John A Ricci
(74) *Attorney, Agent, or Firm* — Innovation Capital Law Group, LLP; Vic Lin (57) ABSTRACT

A tension management system employs moveable anchors, tension pins, ports and tuning string within torsion spring and cam elastic energy storage and deployment counteracting block and tackle systems. In conjunction with prescribed methods, launching cords and cables can be installed and replaced in field conditions, with precise tension for dynamic balance, without the need for bulky and expensive external presses.

20 Claims, 8 Drawing Sheets

(56) References Cited

U.S. PATENT DOCUMENTS 9,651,331 B2* 5/2017 Kim .......................... F41B 5/12
2009/0032002 A1* 2/2009 Howard ................ F41B 5/0094
124/25.6

* cited by examiner

TENSION MANAGEMENT SYSTEM AND METHODS FOR TORSION DRIVEN, COUNTERACTING BLOCK AND TACKLE PULLEY TYPE ELASTIC ENERGY STORAGE AND DEPLOYMENT SYSTEMS

CROSS-REFERENCE TO RELATED APPLICATIONS

This application claims the benefit of priority of U.S. Provisional patent application Ser. No. 62/625,854, filed Feb. 2, 2018, the contents of which are herein incorporated by reference.

BACKGROUND OF THE INVENTION

1. Field of the Invention

Embodiments of the invention relates generally to tension management systems within torsional spring and cam types of elastic energy storage and deployment systems within compact arrow launching devices that utilize counteracting block and tackle pulley systems (torsion driven systems). Particularly, embodiments of the invention relate to adjusting tension in cables and a launching cord within such devices.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Conventional systems and methods of adjusting tension and or replacing cables and launching cords are known. While traditional compound bows have relied upon separate bow press devices to achieve these goals, the vastly different structural composition, kinematics and compact nature of torsion driven systems, renders current presses ineffective. To date, torsion driven systems tuning has been performed with basic hand tensioning methods.

However, these conventional systems and methods have limitations. While a separate bow press configuration may be feasible for torsion driven systems, they are likely to add expense, be difficult to manage in field conditions and require the services of a trained professional to perform. In addition, the emerging technology of torsion driven systems is currently unknown to most professionals, requiring expensive training for effective service.

Current hand tensioning methods have proven to lack precision in tuning torsion driven systems. Maintaining launching cord tension by hand, while tying an anchor knot, results in tension that is widely variable and difficult to precisely determine. Additionally, hand tensioning methods have not been effective in balancing the cable length and tension equally among all the cams in the torsion driven systems.

It is therefore an object of the present invention to provide a tension management system that can overcome the above limitations.

SUMMARY OF THE INVENTION

Aspects of the present invention are achieved by providing a cable and launching cord tensioning system comprising a cam having a moveable cable anchor. The cam having a port positioned in its profile can be aligned to a corresponding port in or on the frame of the compact arrow launching device. A tension pin can be inserted into the ports in the cam and frame to maintain precise alignment between the cam port and the frame port and relieve tension from the launching cord and cables.

An aspect of the invention provides a method for adjusting tension in a torsion driven system within a compact arrow launching device. The method comprises the steps of positioning the moveable cable anchor on one or more cams to adjust the overall amount of tension in the cables and launching cord and or equally balance tension among the cables and launching cord within the compact arrow launching device.

Another aspect of the invention provides a method for installing cables and launching cord in a torsion driven system. The method comprises the steps of connecting cables to all moveable cable anchors and corresponding connection points on the counteracting block and tackle system. A temporary tuning string is installed into the counteractive block and tackle system. Adding initial tension to the tuning string is done to position cam ports near the corresponding ports located on the frame. Individual cam ports may be further aligned to corresponding frame ports by adjusting the position of the moveable cable anchors on each cam. Once cam ports and frame ports are aligned the tension pins may be placed within the cam ports and frame ports. The tension in the torsion driven system is now supported by the tension pins and frame. The tension may now be removed from tuning string and it can be replaced by the launching cord. Moveable cable anchors may be positioned to aid the placement position of the launching cord. When cable tension has been balanced, the tension pins can be removed, restoring tension to the cables and launching cord.

In another aspect of the invention a method is provided for replacing cables and or launching cord in a torsion driven system. The existing launching cord is tensioned to position cam ports near the corresponding ports located on the frame. Individual cam ports may be further aligned to corresponding frame ports by adjusting the position of the moveable cable anchors. Once cam ports and frame ports are aligned the tension pins may be placed within the cam port and frame port. The tension in the torsion driven system is now supported by the tension pins and frame. The tension may now be removed from the existing launching cord and it can be replaced by a new launching cord. Moveable cables anchors may be positioned to aid the placement position of the launching cord. When cable tension has been balanced, the tension pins can be removed, restoring tension to the cables and launching cord.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a tension management system for torsional spring and cam types of elastic energy storage and deployment systems within compact arrow launching devices that utilize counteracting block and tackle pulley systems (torsion driven systems). Particularly, embodiments of the invention relate to adjusting tension in cables via independently moveable cable anchors that adjust the length of each cable and regulate the amount of tension in each cable and or the entire launching cord. Cam ports and frame ports positioned adjacent to each other allow a removable tension pin to connect both ports and transfer tension from the torsion spring and cam into the frame, which, in turn, alleviates tension from the cables and launching cord so that they may be easily removed and or replaced. A temporary tuning string, having a greater length than the launching cord, is used as a surrogate launching cord to add initial tension to cables, and position cam ports adjacent to frame ports, so that tension pins can alleviates tension from the cables and tuning cord in order to install an initial launching cord or replace a broken launching cord.

Referring to FIGS. 1 through 6, wherein like reference numerals refer to like components in the various views, there is illustrated therein a new and improved tension management system for torsion driven systems, also simply referred to as system 100.

Figure 1A:
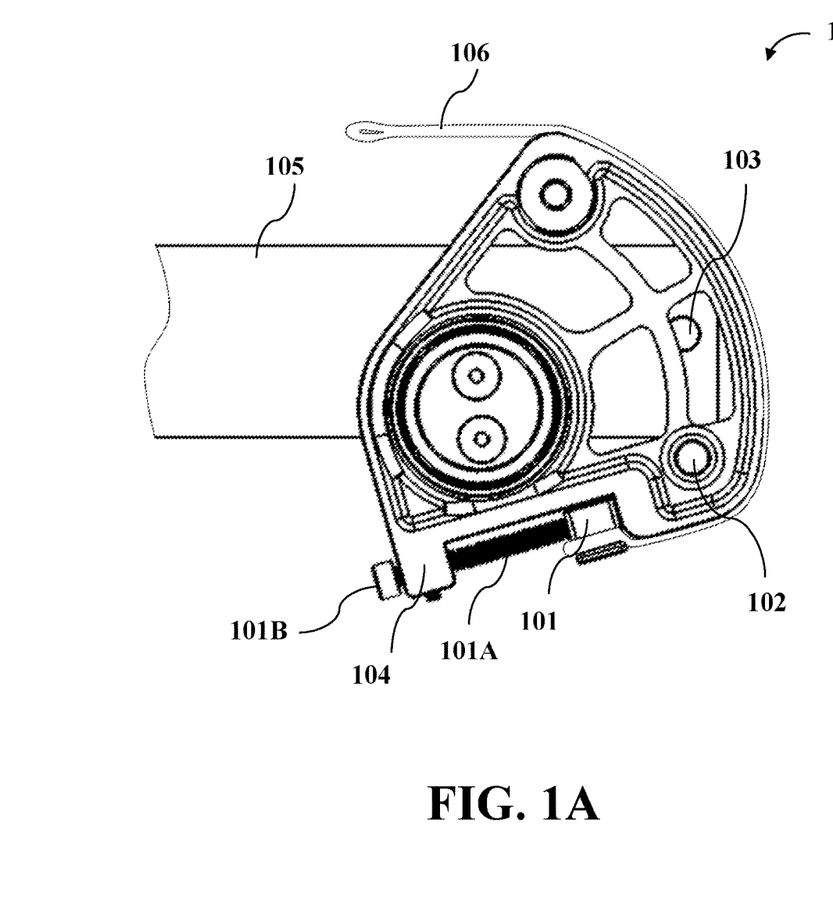
FIG. 1A is side elevation view of moveable cable anchor in a relaxed or un-tensioned position along with cam ports and frame ports.
Figure 1B:
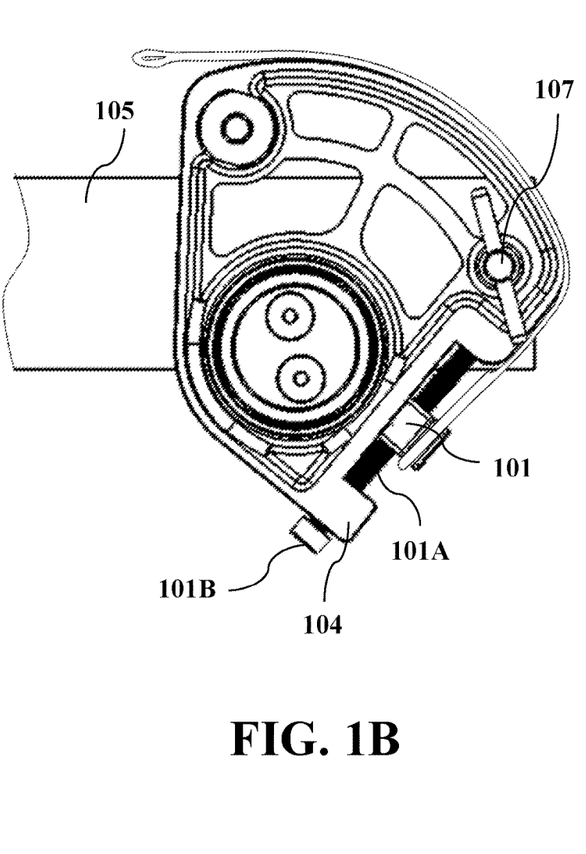
FIG. 1B is side elevation view of FIG. 1A in a tensioned position.

As illustrated in FIG. 1A and FIG. 1B, in accordance with an embodiment of the present invention, the tension management system 100 has a moveable cable anchor 101, mounted to the body of a captive screw 101A, which is connected to the cam 104 at both ends of captive screw body 101A, such that the head of the captive screw 101B may freely rotate and, in turn, move movable cable anchor 101 along the length of captive screw 101A in either direction. The cam 104 has a port 102 within its cam profile and the frame 105 has a corresponding port 103.

A flexible cable 106, having two ends, is aligned within a channel the top of cam 104 such that one end of cable 106 is attached to the moveable cable anchor 101. The end of cable 106 may be configured with a loop end and be secured over moveable anchor 101, though alternative attachment configurations are possible. FIG. 1A shows the cam in a relaxed or un-tensioned position with cam port 102 not directly adjacent to frame port 103 and moveable cable anchor 101 is its extreme position allowing the greatest length of flexible cable 106 to extend away from cam 104. FIG. 1B depicts cam 104 in a position after the captive screw head 101B has rotated the body of the captive bolt 101A and positioned moveable cable anchor 101 mid way along the body of the captive bolt 101A. The result is a shorter length of flexible cable 106 extending away from cam 104 and has cam port 102 is positioned directly adjacent frame port 103, allowing a tension pin 107 to connect the two ports. Additionally, alternatives for aligning the cams with the frame could involve several temporary connections to transfer tension from the cam to the frame, such as a latch affixed to the cam and or the frame. While the tension pin 107 is separate or removable, a temporary connection between the cam 104 and frame 105 could be integrated as part of either or both of the cam 104 or frame 105. Additionally, alternative embodiments may provide a means for moving or repositioning the cable anchor port 102 on the cam 104, while under tension. For example, a ratchet alternative could allow a moveable cable anchor to be repositioned under tension.

Figure 2:
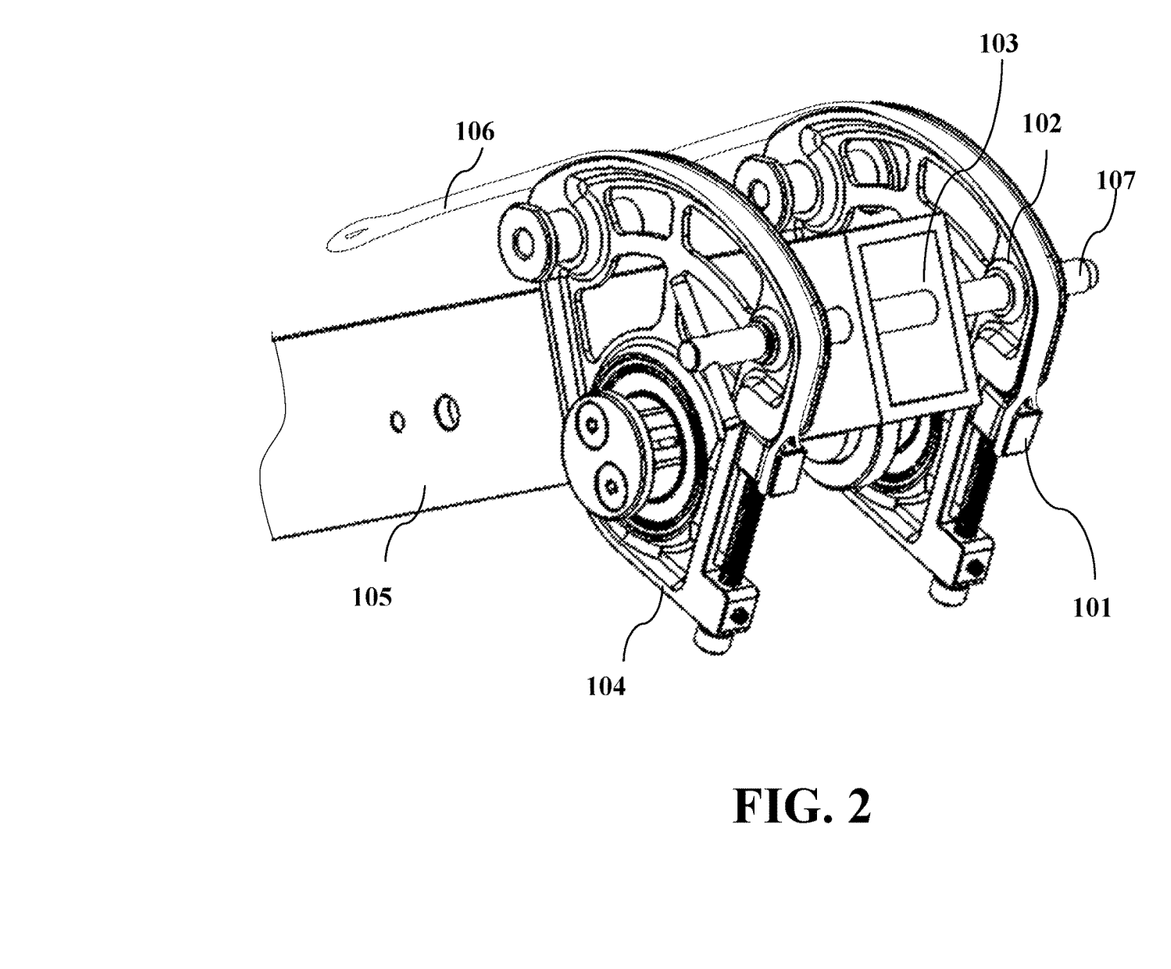
FIG. 2 is a perspective view of FIG. 1B in a tensioned position.

As shown in FIG. 2, a configuration with a single tension pin 107 uniting the ports of multiple cams and frame locations is possible. Alternative embodiments may permit numerous combinations of tension pin or pins and port locations to achieve the same positioning objectives.

Figure 3:
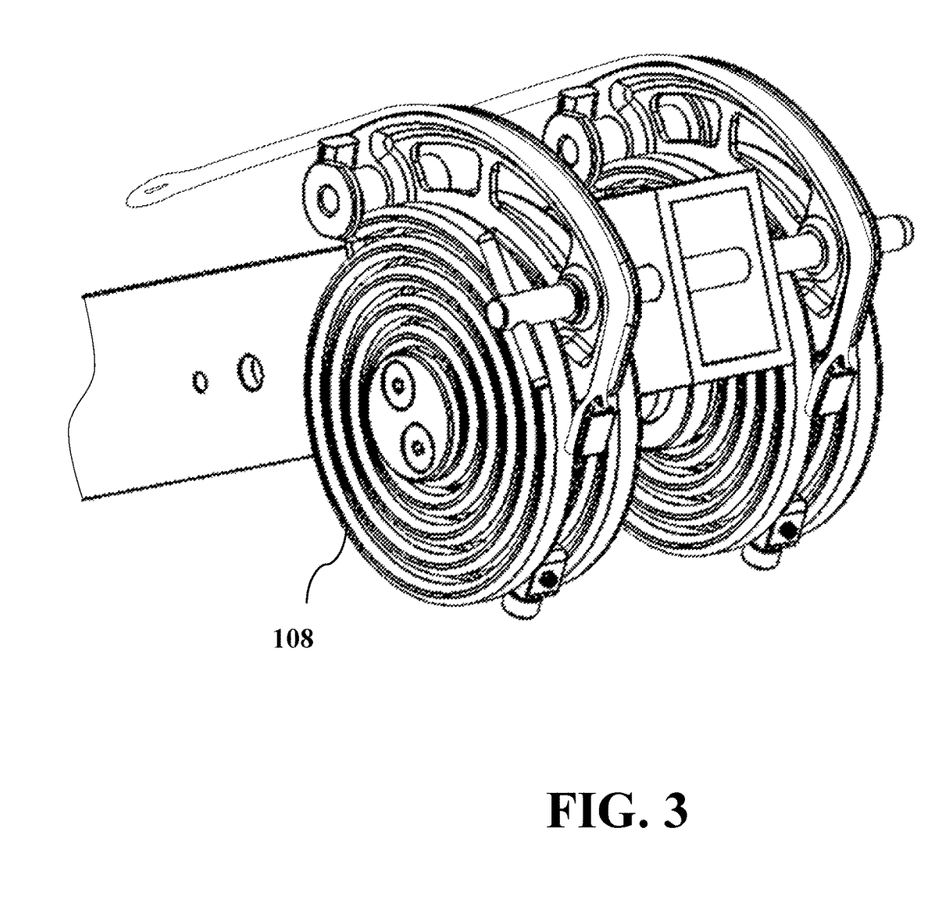
FIG. 3 is a perspective view of FIG. 1B, along with torsion springs, in a tensioned position.

FIG. 3 depicts a torsional system that employs spiral torsion springs 108. System 100 is configurable within alternative torsional systems as well.

Figure 4:
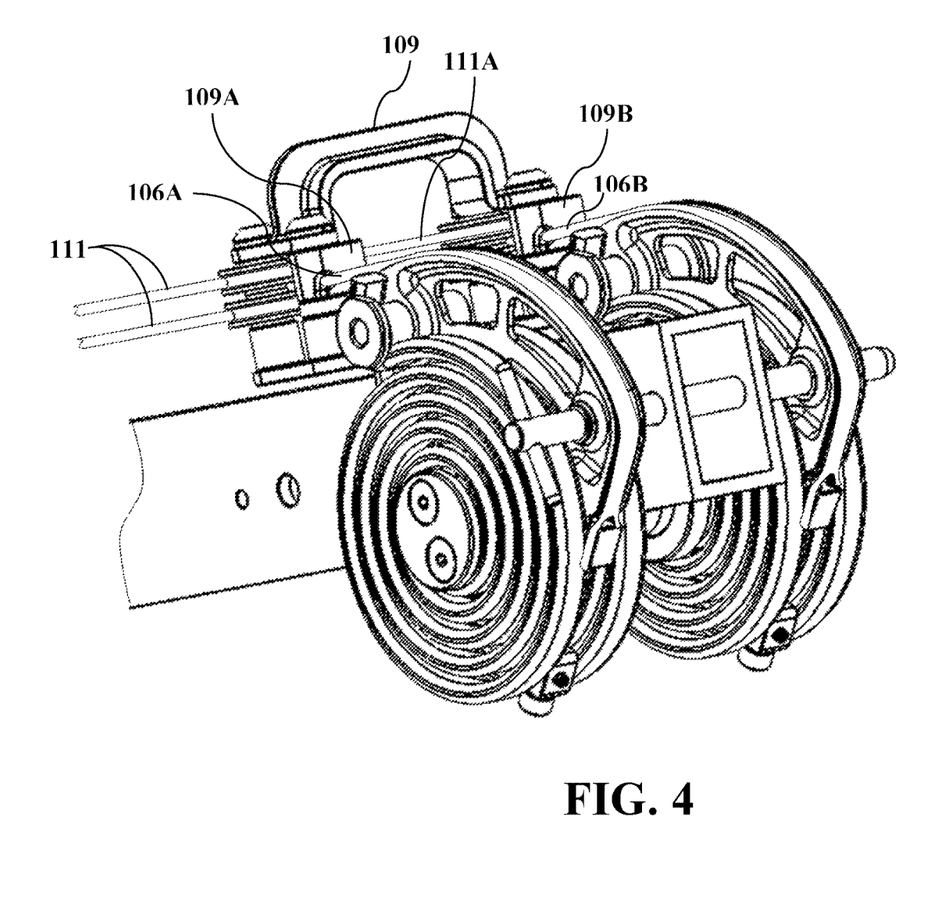
FIG. 4 is a perspective view of FIG. 3, along with a front pulley block.

FIG. 4 shows the front pulley block 109 of a torsion driven system. Flexible cable end 106A is connected to the point 109A of the front pulley block 109 and flexible cable end 106B is connected to the point 109B of the front pulley block 109. Such torsion driven systems typically utilize a single launching cord 111 that unites the counteracting block and tackle at mid-point of the launching cord 111A.

Figure 5:
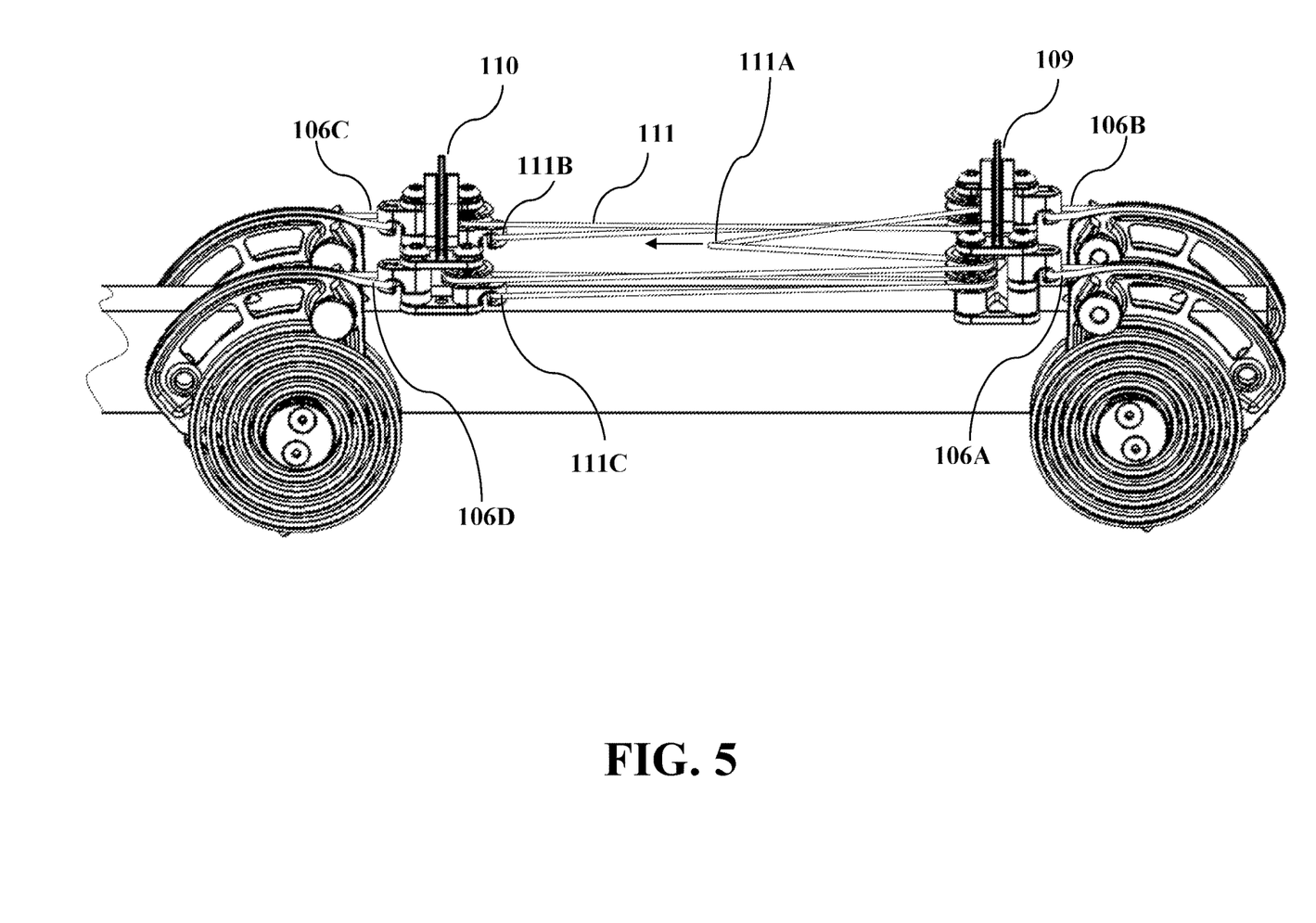
FIG. 5 is a full side perspective view illustrating a full torsion driven system in a partially tensioned position.

FIG. 5 is presented as context for understanding tensioning management aspects of system 100. The entire torsion driven system is shown in FIG. 5 but depicted in a partially tensioned position. Launching cord 111 makes a serpentine path that unites front pulley block 109 with rear pulley block 110, the launching cord 111 terminating in the rear pulley block 110 at launching cord ends 111B and 111C. Tension is increased in the system as the launching cord center point 111A is drawn rearward and the pulley blocks 109 and 110 are drawn towards each other, as the spring resistance is transferred to front pulley block 109 via cable ends 106A and 106B and to rear pulley block 110 via cable ends 106C and 106D.

Figure 6A:
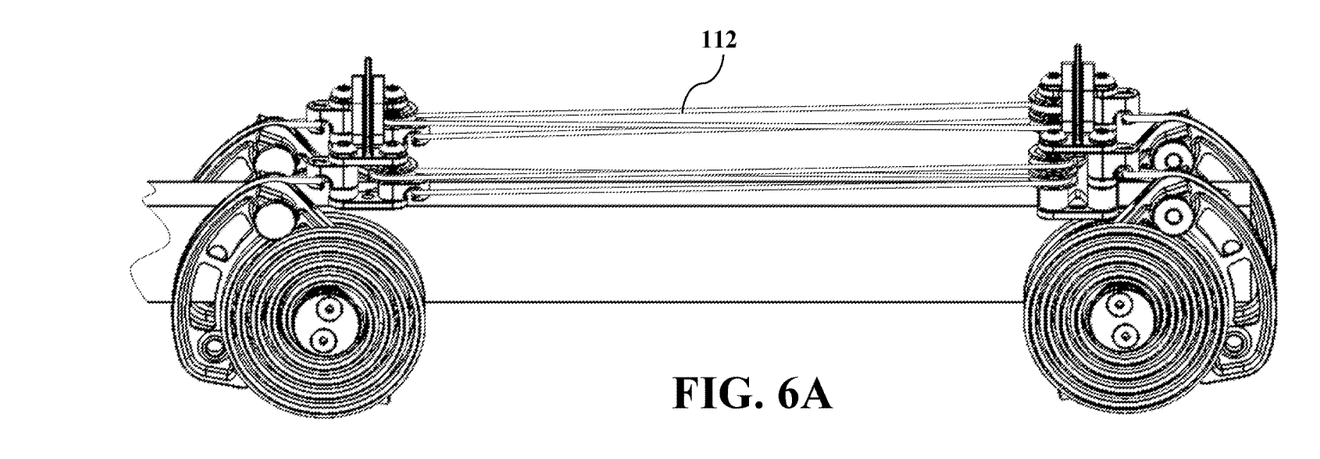
FIG. 6A is a side perspective view of FIG. 5 including a tuning string in a relaxed or un-tensioned position.
Figure 6B:
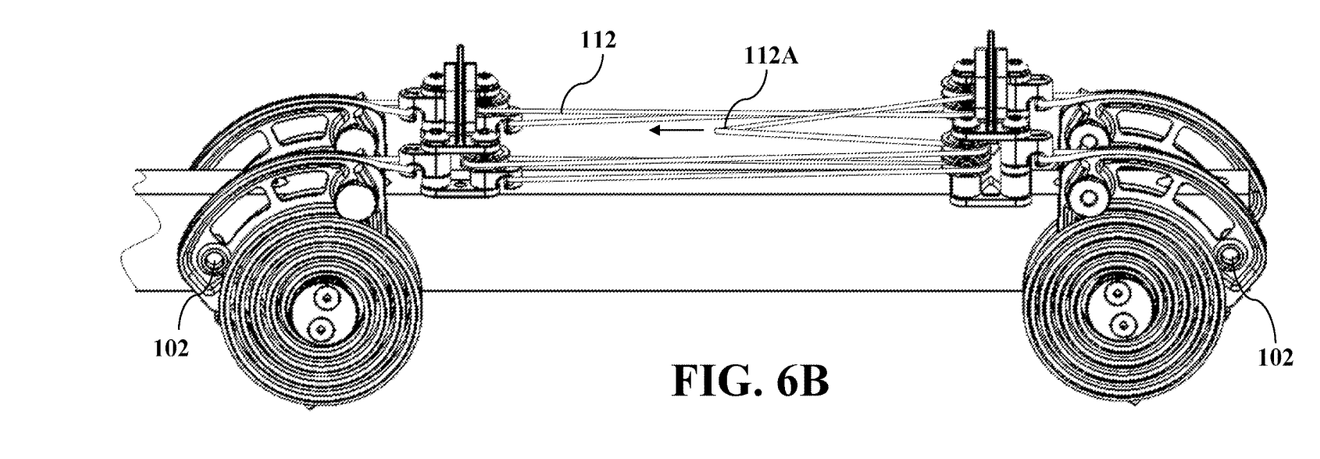
FIG. 6B is a side perspective view of the system in FIG. 6A held in a tensioned position by the center point of a tuning string.

FIG. 6A-D illustrates tension management aspects of system 100. FIG. 6A shows the same torsional driven system as FIG. 5, except that the system is now in a fully relaxed and un-tensioned position and launching cord 111 has been replaced with a tuning string 112. The tuning string 112 is longer than the launching cord, as it must be able to draw the system from a relaxed state to a pre-tensioned position by tensioning it rearward from the tuning string center point 112A, as seen in FIG. 6B, where all cam ports 102 are aligned with their corresponding frame ports. Cam ports requiring further alignment may be individually adjusted via moveable cable anchors on each cam. Additionally, a cocking winch (not pictured) may be used to assist in tensioning the tuning string.

Figure 6C:
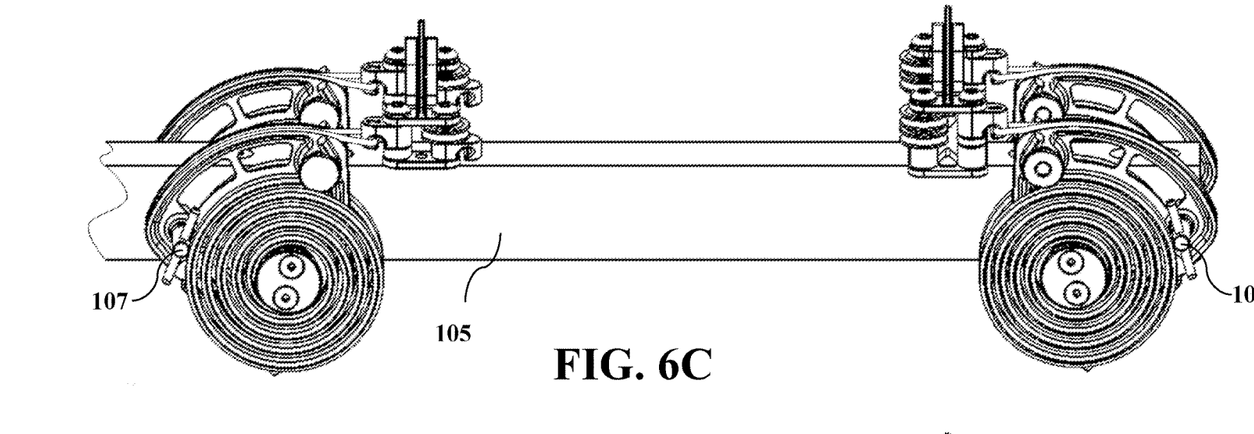
FIG. 6C is a side perspective view of the system in FIG. 6A held in tension by removable pins connecting the cam and frame ports and the tuning string removed.
Figure 6D:
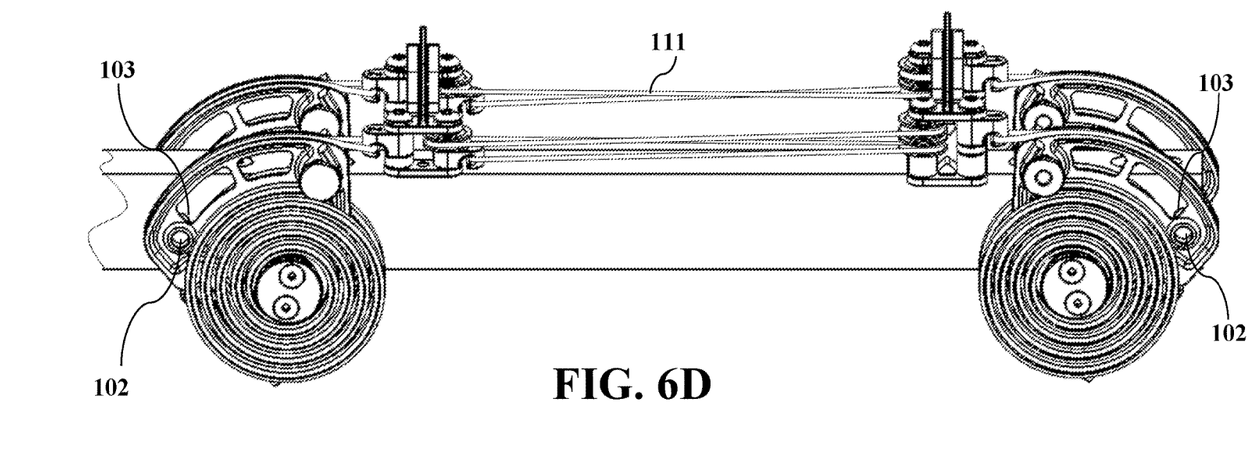
FIG. 6D is a side perspective view of the system in FIG. 6C with a launching cord, the tension pins and tuning string removed.

FIG. 6C shows the same torsion driven system as FIG. 6A-B, however the tension pins 107 have been placed within the cam and frame ports, effectively storing the pretension within the tensioning pins 107 and frame 105, allowing the tuning string (not pictured) to be removed. This method allows the installation of a launching cord 111 to be installed while keeping exact pretension within all cables, as shown in FIG. 6D. It is after this installation that the tension pins (not pictured) are removed, transferring tension back into the torsion driven system, while maintaining the exact balance of pre-tension in the system, as cam ports 102 and frames ports 103 are positioned in precise adjacent alignment.

Figure 7:
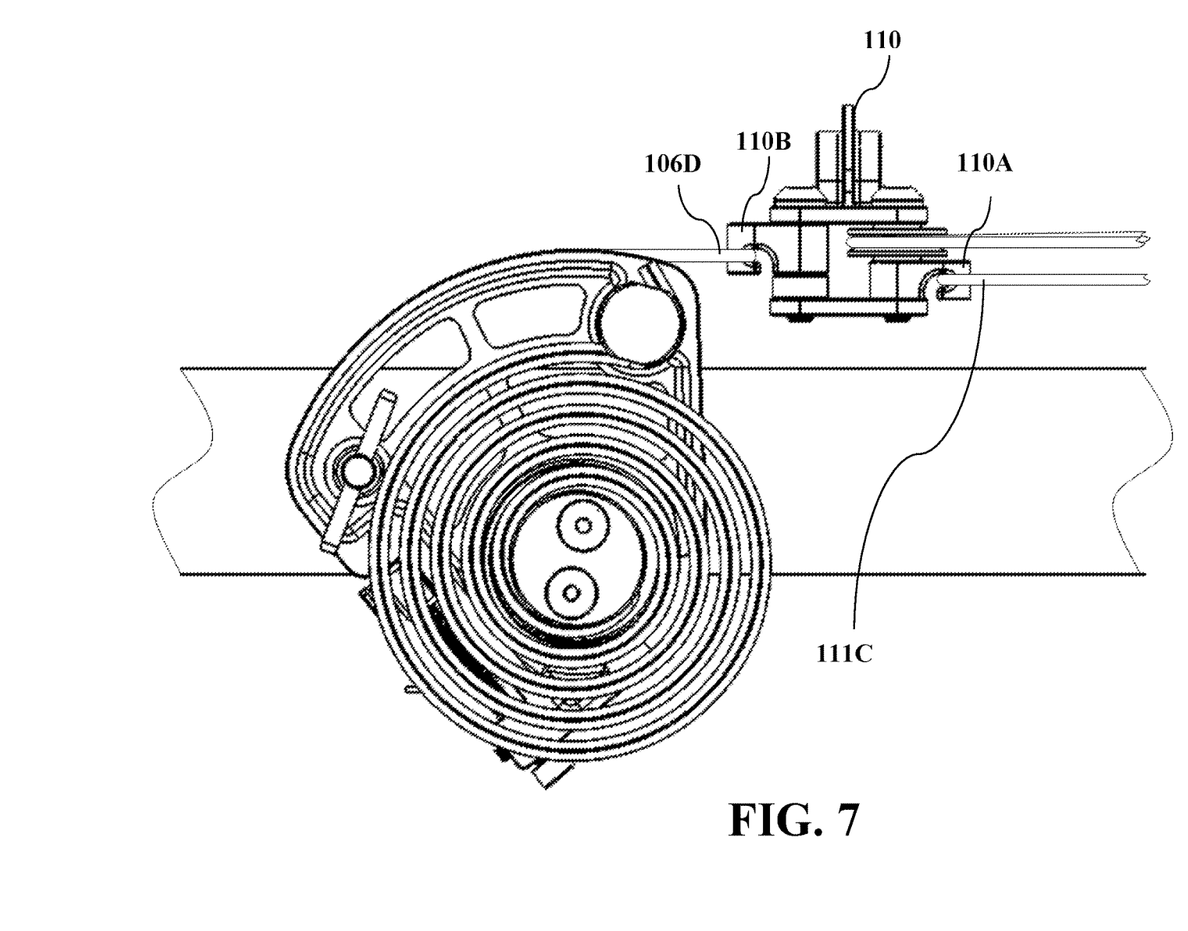
FIG. 7 is a perspective view of an alternative embodiment showing the tuning system featuring pulley blocks with hook type anchors for cables and launching cord.

FIG. 7 illustrates rear pulley block 110 as an example of an exemplary embodiment of system 100 in which the launching cord hooks 110A and cable hooks 110B allow launching cord end 111C and cable ends 106D to be quickly detached from rear pulley block 110. It should be appreciated that the same embodiment can be applied to the front pulley block 109 (not pictured).

Hence, the various embodiments of the invention provide multiple benefits, which include the following: adjusting tension within torsion driven systems can be precisely achieved with little need for large, expensive external presses, and strings and cables can be easily tuned and or replaced under almost any field condition. Additionally, the simplicity of the tensioning system should be easily executed by those unskilled in the art, reducing the need for costly and inconvenient maintenance.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense, it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A tension management system comprising:
   at least one moveable cable anchor attached to a cam;
   at least one cam port located within a profile of the cam; and
   a ridged frame containing at least one frame port located adjacent to the at least one cam port in the cam profile.

2. The tension management system of claim 1, wherein the tension management system is a component of a torsion spring and cam elastic energy storage and deployment counteracting block and tackle system.

3. The tension management system of claim 1, further comprising at least one pin configured to pass through one of the at least one cam port and into one of the at least one frame port.

4. The tension management system of claim 1, further comprising at least one pulley block with at least one launching cord anchor for anchoring a launching cord.

5. The tension management system of claim 4, further comprising a flexible tuning string at a length exceeding that of the launching cord, having a first end and a second end.

6. The tension management system of claim 4, wherein the at least one launching cord anchor is a hook shaped anchor.

7. The tension management system of claim 1, further comprising at least one pulley block with at least one hook shaped cable anchor.

8. A method of installing cables and a launching cord in a torsion spring and cam elastic energy storage and deployment counteracting block and tackle system, the method comprising:
   connecting a first end of at least one cable to respective movable cable anchors on at least one cam;
   connecting a second end of the at least one cable to a connection point on a pulley block;
   moving the pulley block to tension the at least one cable;
   aligning a cam port in each of the at least one cam to at least one frame port formed in a rigid frame supporting the at least one cam;
   placing a pin through the aligned cam port and frame port;
   installing the launching cord in the torsion spring and cam elastic energy storage and deployment counteracting block and tackle system.

9. The method of claim 8, wherein:
   the at least one cable includes a first cable, a second cable, a third cable and a fourth cable;
   the at least one cam includes a first cam, a second cam, a third cam and a fourth cam;
   the pulley block includes a first pulley block, attached to the second end of the first cable and the second cable, and a second pulley block, attached to the second end of the third cable and the fourth cable.

10. The method of claim 9, further comprising connecting a flexible tuning string to unite the first pulley block and the second pulley block.

11. The method of claim 10, further comprising tensioning the flexible tuning string to align the cam ports with the frame ports.

12. The method of claim 11, further comprising:
    relieving tension in the flexible tuning string; and
    replacing the flexible tuning string with the launching cord.

13. The method of claim 8, further comprising adjusting the movable cable anchors on each of the at least one cams to align the cam ports with the frame ports when the pulley block is moved to tension the at least one cable.

14. A method of using a torsion spring and cam elastic energy storage and deployment counteracting block and tackle system comprising:
    transferring tension from cables and a launching cord to a ridged frame within the torsion spring and cam elastic energy storage and deployment counteracting block and tackle system by adding tension to the launching cord to position a cam port directly adjacent a frame port in the ridged frame, connecting a pin between the cam port and the frame port, and relieving tension in the launching cord.

15. The method of claim 14, wherein:
    the cables include a first cable having a first end attached to a first movable cable anchor of a first cam, a second cable having a first end attached to a second movable cable anchor of a second cam, a third cable having a first end attached to a third movable cable anchor of a third cam and a fourth cable having a first end attached to a fourth movable cable anchor of a fourth cam;
    the first cable and the second cable each having a second end attached to a first pulley block; and
    the third cable and the fourth cable each having a second end attached to a second pulley block.

16. The method of claim 15, wherein:
    a first cam port of the first cam and a second cam port of the second cam align with a first frame port in the rigid frame;
    a third cam port in the third cam and a fourth cam port of the fourth cam align with a second frame port in the rigid frame; and
    the pin includes a first pin and a second pin.

17. The method of claim 15, further comprising:
    moving at least one of the first, second, third and fourth movable cable anchors rearward to increase tension in at least one of the first, second, third and fourth cable, respectively; and
    moving at least one of the first, second, third and fourth movable cable anchors forward to decrease tension in at least one of the first, second, third and fourth cable, respectively.

18. A method for adjusting tension in at least one of a cable and a launching cord within a torsion spring and cam elastic energy storage and deployment counteracting block and tackle system comprising:
    extending a first cable between a first pulley block and a first movable cable anchor of a first cam;
    moving the movable cable anchor rearward to increase tension; and
    moving the movable cable anchor forward to decrease tension.

19. The method of claim 18, wherein:
    the at least one cable includes a first cable having a first end attached to a first movable cable anchor of a first cam, a second cable having a first end attached to a second movable cable anchor of a second cam, a third cable having a first end attached to a third movable cable anchor of a third cam and a fourth cable having a first end attached to a fourth movable cable anchor of a fourth cam;

the first cable and the second cable each having a second end attached to a first pulley block; and the third cable and the fourth cable each having a second end attached to a second pulley block.

20. The method of claim 19, further comprising:

adjusting tension of the first cable and the second cable to apply even force on the first pulley block; and adjusting tension of the third cable and the fourth cable to apply even force on the second pulley block.

\* \* \* \* \*